United States Patent
Froget

[15] 3,661,665
[45] May 9, 1972

[54] METHOD OF MANUFACTURING A COMPOSITE WEB

[72] Inventor: Pierre Froget, Nemours, France

[73] Assignee: "GRIESSER", Carros (Alpes Maritimes), France

[22] Filed: Aug. 20, 1969

[21] Appl. No.: 851,599

[30] Foreign Application Priority Data

Aug. 22, 1968 France..................................163771

[52] U.S. Cl..............................156/65, 156/272, 156/289, 160/166 R
[51] Int. Cl. .....................................E06b 9/26, E06b 9/303
[58] Field of Search....................156/289, 290, 274, 273, 65; 160/405, 166, 174, 178, 405

[56] References Cited

UNITED STATES PATENTS 3,006,257  10/1961  Orsini.................................156/290 X
3,384,519  5/1968  Froget.....................................156/65

Primary Examiner—Carl D. Quarforth
Assistant Examiner—E. E. Lehmann
Attorney—Linton & Linton

[57] ABSTRACT

This invention is concerned with a method of continuously manufacturing a composite web comprising two flexibles superposed sheets assembled at spaced intervals by parallel flexible strips secured by their edges to the pair of superposed sheets so that a movement of the parallel strips can be obtained by moving said superposed sheets in relation to each other, this method consisting in causing the pair of sheets and their intermediate strips to be fed continuously between the pressure members of a heat-welding set while welding each edge of the intermediate strip only to the single sheet to which this edge is to be secured, an insulating sheet being interposed between the strip and the sheet to which this strip is not to be welded, for preventing the intermediate strip from being welded simultaneously to both sheets of the composite web without welding said insulating sheet to the elements between which it is inserted.

1 Claim, 1 Drawing Figure

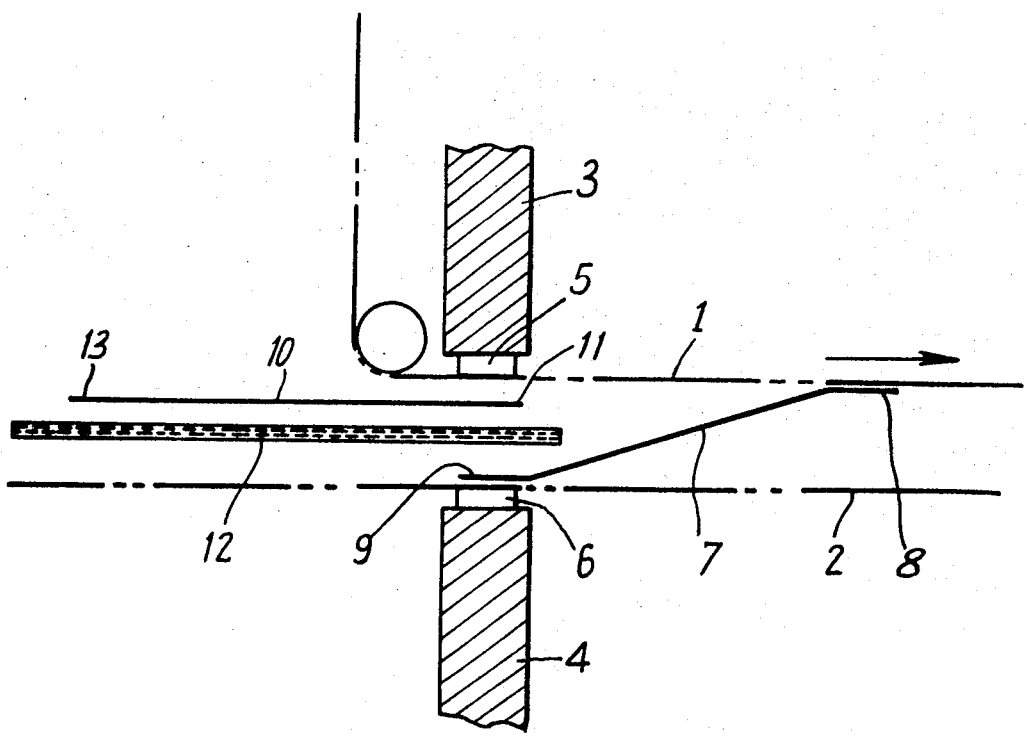

METHOD OF MANUFACTURING A COMPOSITE WEB

This invention relates to the continuous manufacture of composite webs comprising two flexible superposed sheets assembled at spaced intervals by parallel flexible strips secured by their edges to the pair of superposed sheets so that a movement of the parallel strips can be obtained by moving said superposed sheets in relation to each other.

Composite webs of this character are used in particular for making roller-blinds permitting the passage of a variable quantity of light according to the relative position of said sheets made preferably of translucent or apertured material and assembled by less translucent or opaque strips.

The edges of the parallel strips are usually secured by heat welding. To this end, the material constituting said superposed sheets and said parallel strips comprises as a rule a heat-weldable plastic material, at least for one fraction or portion of these elements, but if other materials are used or if the quantity of heat-weldable material is not sufficient for performing the desired welding operation the latter can nevertheless be carried out by the addition of weldable thermoplastic material.

The hitherto known method of making such composite webs by heat-welding consisted in welding firstly the successive parallel strips to one of the flexible sheets, then welding said strips to the other sheet while keeping this other sheet somewhat spaced from the first one which was not passed between the pressure members of the heat-welding set. The two welding operations could be combined for continuous production but in this case two combined or associated heat-welding sets had to be installed for welding the strips to the two sheets and these sets had to be operatively interconnected in a suitable manner. Obviously, the equipment necessary for meeting the various production requirements was elaborate and cumbersome, and its operation involved a difficult and constant supervision.

It is the essential object of this invention to avoid these inconveniences and to this end the present invention is based upon the discovery that it was possible to cause the pair of sheets and their intermediate strips to be fed continuously between the pressure members of a heat-welding set while welding each edge of the intermediate strip only to the single sheet to which this edge had to be secured. This invention consists, when clamping the pressure members performing the heat-welding operation proper, in interposing between the strip and the sheet to which it is not to be welded, an insulating sheet preventing the intermediate strip from being welded simultaneously to both sheets of the composite web, without welding said insulating sheet to the elements between which it is inserted.

Thus, for welding the other edge of the strip it is no more necessary to provide upstream of the welding set some means for returning the sheet to which the strip is already welded in order to prevent this sheet from being fed between the pressure members of the welding set, so that the operation becomes considerably more reliable and faster.

Moreover, according to a complementary feature characterizing this invention it is possible to perform simultaneously in a same and single welding set the second welding step for securing a strip to one of the sheets of the web and the first welding of the next strip to the other sheet by the same clamping movement of the pressure members, and the method can be carried out very easily without resorting to complicated and costly equipment. The web feeding and winding operation, and the operation consisting in positioning the strips and the insulating material, may even be performed manually if the production contemplated does not justify the use of automatic machines therefor.

The features and advantages characterizing this invention will appear more obviously as the following description proceeds with reference to a specific form of embodiment thereof shown diagrammatically in the single FIGURE of the attached drawing consisting of a vertical axial section taken at right angles to the web plane and parallel to the direction of feed of this web through a welding set.

In the drawing, the reference numeral 1 designates the upper sheet of the composite web and 2 is the lower sheet, these sheets travelling in the direction of the arrow between the upper jaw 3 supporting at its lower face a heating and pressure plate or blade 5 and a lower jaw 4 supporting on its top face a registering heating and pressure plate or blade 6.

In the drawing it is assumed that a strip 7 inserted between these sheets 1 and 2 has already been welded along its front or leading edge 8 to the lower face of sheet 1, the rear or trailing edge 9 of the strip 7 overlying the lower jaw 4 so as to be subsequently welded to the upper face of sheet 2. The next strip 10 has been brought in position so that its leading edge 11 lies beneath the upper jaw 3 and a sheet 12 of insulating material is interposed between the edges 9 and 11 to permit the simultaneous welding of these edges to the pair of corresponding sheets.

This welding operation is carried out by clamping the two jaws 3, 4 illustrated at the moment when their pressure members 5, 6 moving towards each other engage the sheets 1 and 2 before exerting the welding pressure. It is clear that the heated plate 5 will weld the edge 11 to sheet 1 without causing the lower face of this edge 11 to be welded to the insulating material 12 separating this face from the lower heating plate 6. At the same time, this plate 6 welds similarly the edge 9 to sheet 2.

After a clamping time just sufficient for producing the pair of welds contemplated the jaws 3, 4 are moved away from each other to release the elements interposed therebetween and separate the sheets 1 and 2 which are then fed together in the direction of the arrow while causing the insulating sheet 12 to recede so that the trailing edge 13 of strip 10 can engage the sheet 2 above jaw 4 in the position occupied in the figure by the edge 9, this new strip 10 then occupying the position shown in the drawing but in the case of the preceding strip 7. Before carrying out the subsequent double welding step the insulating sheet 12 is returned to the position illustrated and a fresh strip to be welded is positioned as shown in the drawing but in the case of strip 10.

It will be seen that each clamping movement of the pair of jaws 3, 4 permits of simultaneously performing the second welding step to the sheet 2 of the strip already welded along its leading edge to the sheet 1 and the first welding to the sheet 1 of the next strip. The web feed between successive welding operations corresponds to the pitch or distance between successive strips.

The obtained composite web rolls on a spool disposed down-stream of the welding set, while upstream of the welding set the two sheets 1–2 can come from two separate spools.

It is obvious that the feed motion of the web thus constituted and the positioning of new strips and of the insulating sheet can also be obtained by using adequate and known timing or synchronous mechanisms.

Although the pressure and welding members 5 and 6 have been shown as registering with each other, this arrangement is not compulsory and if desired the edges such as 9 and 11 may be welded simultaneously by clamping jaws carrying the heated members 4, 6 but in mutually shifted positions.

The insulating sheet 12 consists of any suitable insulating material such as asbestos or glass fiber material; it has preferably a flexible or hinged structure in order to avoid any interference with the clamping operations.

Although in the foregoing pressure-welding along the entire weld seam has been suggested for carrying out this invention, it will readily occur to those conversant with the art that another welding procedure such as line welding (by using suitable rollers) may also be used. Besides, heat-welding is referred to more particularly in the above disclosure, but this invention is also applicable to any other welding means wherein the interposition of an insulating material between the two sheets will permit of limiting each welding operation to the bonding of a strip to only one of the two sheets while causing these sheets to travel through the field of action of the welding machine.

What is claimed is:

1. A method of manufacturing a continuous composite web of a pair of flexible superposed sheets connected at spaced intervals by parallel flexible strips secured by their edges to said pair of superposed sheets in such a manner that a movement of said parallel strips can be obtained by moving said superposed sheets in relation to each other, consisting in moving said superposed sheets between a heat welding set, feeding said flexible strips one at a time between said moving superposed sheets with the leading edge of the strip being fed superposed above the trailing edge of a strip already attached to the upper of said superposed sheets, inserting a sheet of insulating material between said superposed strip leading edge and said attached strip trailing edge, clamping said welding set against said strips leading edge and trailing edge whereby said strip leading edge is welded to the uppermost of said sheets and said strip trailing edge is simultaneously welded to the lowermost of said sheets, withdrawing said insulating of insulating material and repeating the above steps.

* * * * *